(12) United States Patent
Hasegawa et al.

(10) Patent No.: US 12,116,649 B2
(45) Date of Patent: Oct. 15, 2024

(54) HIGH-STRENGTH HOT-DIP GALVANIZED STEEL SHEET AND METHOD FOR MANUFACTURING THE SAME

(71) Applicant: JFE Steel Corporation, Tokyo (JP)

(72) Inventors: Hiroshi Hasegawa, Tokyo (JP); Tatsuya Nakagaito, Tokyo (JP); Yuki Takeda, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 645 days.

(21) Appl. No.: 17/417,897

(22) PCT Filed: Aug. 23, 2019

(86) PCT No.: PCT/JP2019/033082
§ 371 (c)(1),
(2) Date: Jun. 24, 2021

(87) PCT Pub. No.: WO2020/136990
PCT Pub. Date: Jul. 2, 2020

(65) Prior Publication Data
US 2022/0090223 A1 Mar. 24, 2022

(30) Foreign Application Priority Data
Dec. 26, 2018 (JP) ................ 2018-242712

(51) Int. Cl.
| | | |
|---|---|---|
| *C21D 9/46* | (2006.01) | |
| *C21D 6/00* | (2006.01) | |
| *C21D 8/02* | (2006.01) | |
| *C22C 38/00* | (2006.01) | |
| *C22C 38/02* | (2006.01) | |
| *C22C 38/04* | (2006.01) | |
| *C22C 38/06* | (2006.01) | |
| *C22C 38/08* | (2006.01) | |
| *C22C 38/12* | (2006.01) | |
| *C22C 38/14* | (2006.01) | |
| *C22C 38/16* | (2006.01) | |
| *C22C 38/22* | (2006.01) | |
| *C22C 38/28* | (2006.01) | |
| *C22C 38/32* | (2006.01) | |
| *C22C 38/38* | (2006.01) | |
| *C22C 38/60* | (2006.01) | |
| *C23C 2/28* | (2006.01) | |
| *C23C 2/40* | (2006.01) | |

(52) U.S. Cl.
CPC ........... *C21D 9/46* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0263* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/22* (2013.01); *C22C 38/28* (2013.01); *C22C 38/32* (2013.01); *C22C 38/38* (2013.01); *C22C 38/60* (2013.01); *C23C 2/28* (2013.01); *C23C 2/29* (2022.08); *C23C 2/40* (2013.01); *C21D 2211/001* (2013.01); *C21D 2211/002* (2013.01); *C21D 2211/004* (2013.01); *C21D 2211/008* (2013.01)

(58) Field of Classification Search
None
See application file for complete search history.

(56) References Cited

U.S. PATENT DOCUMENTS

| | | | |
|---|---|---|---|
| 10,982,297 B2 | 4/2021 | Ono et al. | |
| 11,085,107 B2 | 8/2021 | Kizu et al. | |
| 2019/0203317 A1 | 7/2019 | Yoshioka et al. | |
| 2020/0032364 A1* | 1/2020 | Hirashima | ........... C21D 8/0226 |

FOREIGN PATENT DOCUMENTS

| | | |
|---|---|---|
| CN | 105814227 A | 7/2016 |
| CN | 106661658 A | 5/2017 |
| CN | 108603269 A | 9/2018 |
| EP | 2594656 A1 | 5/2013 |
| EP | 3054025 A1 | 8/2016 |
| EP | 3173494 A1 | 5/2017 |
| EP | 3219821 A1 | 9/2017 |
| EP | 3415653 A1 | 12/2018 |
| JP | 2004359974 A | 12/2004 |
| JP | 2008291304 A | 12/2008 |

(Continued)

OTHER PUBLICATIONS

Machine translation of JP6421903B1. (Year: 2018).*
Korean Written Decision on Registration for Korean Application No. 10-2021-7019657, dated Apr. 6, 2023 with translation, 4 pages.
Chinese Office Action for Chinese Application No. 201980086631.0, dated Apr. 26, 2022 with Concise Statement of Relevance of Office Action, 9 pages.
International Search Report and Written Opinion for International Application No. PCT/JP2019/033082, dated Nov. 26, 2019, 4 pages.
Extended European Search Report for European Application No. 19 905 911.4, dated Feb. 2, 2022, 8 pages.

*Primary Examiner* — Xiaowei Su
(74) *Attorney, Agent, or Firm* — Buchanan Ingersoll & Rooney PC

(57) ABSTRACT

The high-strength hot-dip galvanized steel sheet has a specific chemical composition and the following steel microstructure. In a region extending from 300 to 400 μm from a surface layer of the steel sheet in a thickness direction of the steel sheet, the total area fraction of martensite and bainite containing carbides is 60 to 100%, and the average grain size of prior austenite is 15 μm or less. In the region extending from 300 to 400 μm from the surface layer of the steel sheet in the thickness direction of the steel sheet, the ratio of the height of a peak of P in an Auger electron spectrum at a position 5 nm or more from a prior-austenite grain boundary to the height of a peak of P in an Auger electron spectrum at the prior-austenite grain boundary is 0.20 or more.

8 Claims, No Drawings

(56) References Cited

FOREIGN PATENT DOCUMENTS

| | | | |
|---|---|---|---|
| JP | 2010215958 A | 9/2010 | |
| JP | 2011190474 A | 9/2011 | |
| JP | 2017115191 A | 6/2017 | |
| JP | 6421903 B1 * | 11/2018 | ........... B32B 15/013 |
| KR | 20170086653 A | 7/2017 | |
| WO | 2018055425 A1 | 3/2018 | |
| WO | 2018062380 A1 | 4/2018 | |
| WO | 2018062381 A1 | 4/2018 | |
| WO | 2018146828 A1 | 8/2018 | |

* cited by examiner

HIGH-STRENGTH HOT-DIP GALVANIZED STEEL SHEET AND METHOD FOR MANUFACTURING THE SAME

CROSS REFERENCE TO RELATED APPLICATIONS

This is the U.S. National Phase application of PCT/JP2019/033082, filed Aug. 23, 2019, which claims priority to Japanese Patent Application No. 2018-242712, filed Dec. 26, 2018, the disclosures of these applications being incorporated herein by reference in their entireties for all purposes.

FIELD OF THE INVENTION

The present invention relates to a high-strength hot-dip galvanized steel sheet suitable for automobile components and to a method for manufacturing the same.

BACKGROUND OF THE INVENTION

From the viewpoint of improving collision safety of automobiles and their fuel efficiency, there is a need to increase the strength of steel sheets used for automobile components. Since these components are exposed to a corrosive environment, requirements on high anticorrosive performance are also increasing. However, in the components exposed to a corrosive environment, when the strength is increased, delayed fracture may occur due to intrusion of hydrogen from the environment, and this is a serious obstacle to increasing the strength of galvanized steel sheets. In particular, many actual components have sheared edge surfaces, and delayed fracture is likely to start from the sheared end faces. Therefore, a technique for improving delayed fracture characteristics is being developed.

For example, Patent Literature 1 and Patent Literature 2 disclose steel sheets in which the amounts, shapes, and distributions of inclusions are controlled such that excellent delayed fracture resistance is obtained when the steel sheets have sheared end faces. On the other hands, various techniques for preventing delayed fracture starting from sheared end faces have been developed, e.g., removal of residual stress on the end faces. Therefore, it may be possible in the future that some end face treatment can be used to prevent delayed fracture starting from end faces. In this case, the delayed fracture resistance of a base material itself having no sheared end faces is important. As for such a technique, Patent Literature 3 discloses a steel sheet in which the delayed fracture resistance is improved by controlling S and MnS in the base material.

PATENT LITERATURE

PTL 1: Japanese Unexamined Patent Application Publication (Translation of PCT Application) No. 2018-62380

PTL 2: Japanese Unexamined Patent Application Publication (Translation of PCT Application) No. 2018-62381

PTL 3: Japanese Unexamined Patent Application Publication No. 2011-190474

SUMMARY OF THE INVENTION

However, although the techniques disclosed in Patent Literature 1 and Patent Literature 2 are effective for delayed fracture starting from sheared end faces, it is unclear whether these techniques are effective in improving the delayed fracture characteristics of the base material. The main features of these techniques are control of inclusions and control of microstructures on the order of micrometers. No studies were made on control of segregation of P at prior-austenite grain boundaries, and there is therefore a room for improvement. With the technique for S disclosed in Patent Literature 3, although the amount of P is reduced, no studies were made on control of segregation of P at grain boundaries, and there is therefore a room for improvement. Aspects of the present invention have been made in view of the above circumstances, and it is an object according to aspects of the invention to provide a high-strength hot-dip galvanized steel sheet having high strength and excellent in delayed fracture resistance and to provide a method for manufacturing the same.

The present inventors have conducted extensive studies and found the following. Specifically, even when the tensile strength (TS) of a steel sheet is 1100 MPa or more, excellent delayed fracture resistance can be obtained when the following conditions are met. The steel sheet has a chemical composition containing, in mass %, C: 0.08 to 0.35%, Si: 0.01 to 3.0%, Mn: 2.0 to 4.0%, P: 0.010% or less (excluding 0), S: 0.002% or less (excluding 0), Al: 0.01 to 1.50%, and B: 0.0005 to 0.010% and further containing one or more selected from Mo: 0.03 to 2.0% and Ti: 0.010 to 0.10%, with the balance being Fe and unavoidable impurities. The total area fraction of martensite and bainite containing carbides is 60 to 100%, the area fraction being determined by microstructure observation at a position 300 to 400 μm from a surface layer of the steel sheet. The average crystal grain size of prior austenite determined by the microstructure observation is 15 μm or less. In a position 300 to 400 μm from the surface layer of the steel sheet, the ratio of the height of a peak of P in an Auger electron spectrum at a position 5 nm or more from a prior-austenite grain boundary to the height of a peak of P in an Auger electron spectrum at the prior-austenite grain boundary is 0.20 or more.

In accordance with aspects of the present invention, the term "high strength" means a tensile strength (TS) of 1100 MPa or more, and the term "excellent delayed fracture resistance" means that, in an SSRT test with a strain rate of 5 μm/min and an applied current density of 0.05 mA/cm$^2$ using a solution containing 3% by mass of NaCl+3 g/L of NH$_4$SCN, the ratio of a maximum stress when hydrogen is added to a maximum stress when no hydrogen is added is 0.70 or more.

Aspects of the present invention have been made based on the above findings and are summarized as follows.

[1] A high-strength hot-dip galvanized steel sheet having a chemical composition containing, in mass %, C: 0.08 to 0.35%, Si: 0.01 to 3.0%, Mn: 2.0 to 4.0%, P: 0.010% or less (excluding 0), S: 0.002% or less (excluding 0), Al: 0.01 to 1.50%, and B: 0.0005 to 0.010% and further containing one or more selected from Mo: 0.03 to 2.0% and Ti: 0.010 to 0.10%, with the balance being Fe and unavoidable impurities, wherein the steel sheet has a steel microstructure in which, in a region extending from 300 to 400 μm from a surface layer of the steel sheet in a thickness direction of the steel sheet, the total area fraction of martensite and bainite containing carbides is 60 to 100%, and the average grain size of prior austenite is 15 μm or less, and in which, in the region extending from 300 to 400 μm from the surface layer of the steel sheet in the thickness direction of the steel sheet, the ratio of the height of a peak of P in an Auger electron spectrum at a position 5 nm or more from a prior-austenite grain boundary to the height of a peak of P in an Auger electron spectrum at the prior-austenite grain boundary is 0.20 or more, and wherein the steel sheet has a hot-dip galvanized layer on a surface thereof.

[2] The high-strength hot-dip galvanized steel sheet according to [1], wherein the chemical composition further contains, in mass %, one or more selected from Nb: 0.005 to 0.20% and V: 0.005 to 2.0%.

[3] The high-strength hot-dip galvanized steel sheet according to [1] or [2], wherein the chemical composition further contains, in mass %, one or more selected from Cr: 0.005 to 2.0%, Ni: 0.005 to 2.0%, Cu: 0.005 to 2.0%, Ca: 0.0002 to 0.0050%, REMs: 0.0002 to 0.0050%, Sn: 0.001 to 0.05%, and Sb: 0.001 to 0.05%.

[4] The high-strength hot-dip galvanized steel sheet according to any one of [1] to [3], wherein the hot-dip galvanized layer is a hot-dip galvannealed layer.

[5] A method for manufacturing a high-strength hot-dip galvanized steel sheet, the method including: subjecting a slab having the chemical composition according to any one of [1] to [3] to hot rolling, cooling, and coiling to thereby produce a hot-rolled sheet; pickling the hot-rolled sheet; cold-rolling the resulting hot-rolled sheet; subjecting the cold-rolled sheet to annealing including heating to 750 to 950° C., holding for 10 to 600 s, then cooling to 550° C. at an average cooling rate of 3° C./s or higher, and holding at Ms temperature to 550° C. for 300 s or shorter; subjecting the annealed sheet to hot-dip galvanizing treatment; optionally subjecting the galvanized sheet to galvannealing treatment; cooling the resulting sheet to the Ms temperature at an average cooling rate of 1° C./s or higher; and then subjecting the resulting sheet to a cooling step such that the following formula (1) is satisfied, wherein, in the cooling step, a strain of more than 0% and 0.067% or less is imparted to the resulting sheet at 250° C. to the Ms temperature:

$$\mathrm{Log}_e([P] \times [C] \times (8.65 - 474 \times D_A \times [B]) \times t) + 35.4 \geq 13320/(273+T) + 4831/(273+T-100 \times [Si]),\quad (1)$$

where, in formula (1), when $D_A \times [B] \geq 0.00912$, $D_A \times [B]$ is set to 0.00912, where [P], [C], [B], and [Si] in formula (1) are the contents (% by mass) of P, C, B, and Si, respectively, in the steel, where $D_A$ is the grain size (μm) of prior austenite, where T is retention temperature (° C.), and where t is a total retention time (s) at the retention temperature.

[6] A method for manufacturing a high-strength hot-dip galvanized steel sheet, the method including: subjecting a slab having the chemical composition according to any one of [1] to [3] to hot rolling, cooling, and coiling to thereby produce a hot-rolled sheet; pickling the hot-rolled sheet; tempering the resulting hot-rolled sheet under the condition of a maximum temperature of lower than 400° C.; cold-rolling the resulting hot-rolled sheet at a rolling reduction of 70% or more; subjecting the cold-rolled sheet to annealing including heating to 750 to 950° C., holding for 10 to 600 s, cooling to 550° C. at an average cooling rate of 3° C./s or higher, and holding at Ms temperature to 550° C. for 300 s or shorter; subjecting the annealed sheet to hot-dip galvanizing treatment; optionally subjecting the galvanized sheet to galvannealing treatment; cooling the resulting sheet to the Ms temperature at an average cooling rate of 1° C./s or higher; and then subjecting the resulting sheet to a subsequent step such that the following formula (1) is satisfied, wherein, in the subsequent step, a strain of more than 0% and 0.067% or less is imparted to the resulting sheet at 250° C. to the Ms temperature:

$$\mathrm{Log}_e([P] \times [C] \times (8.65 - 474 \times D_A \times [B]) \times t) + 35.4 \geq 13320/(273+T) + 4831/(273+T-100 \times [Si]),\quad (1)$$

where, in formula (1), when $D_A \times [B] \geq 0.00912$, $D_A \times [B]$ is set to 0.00912, where [P], [C], [B], and [Si] in formula (1) are the contents (% by mass) of P, C, B, and Si, respectively, in the steel, where $D_A$ is the grain size (μm) of prior austenite, where T is retention temperature (° C.), and where t is a total retention time (s) at the retention temperature.

According to aspects of the present invention, a high-strength galvanized steel sheet suitable for automobile component materials and excellent in delayed fracture resistance can be obtained.

DETAILED DESCRIPTION OF EMBODIMENTS OF THE INVENTION

Embodiments of the present invention will next be described. However, the present invention is not limited to the following embodiments. First, the chemical composition of a high-strength hot-dip galvanized steel sheet (hereinafter may be referred to as a "steel sheet") according to an embodiment will be described. In the description of the chemical composition, "%" in the unit of the content of an element means "% by mass."

C: 0.08 to 0.35%

C is an element effective in increasing TS through the formation of martensite and bainite containing carbides. If the amount of C is less than 0.08%, this effect is not obtained, and the strength and steel microstructure of the steel sheet according to the present embodiment are not obtained. Therefore, the amount of C must be 0.08% or more. The amount of C is preferably 0.10% or more and more preferably 0.13% or more. If the amount of C exceeds 0.35%, the martensite formed is hard, and delayed fracture resistance deteriorates. Therefore, the amount of C must be 0.35% or less. Preferably, the amount of C is 0.33% or less.

Si: 0.01 to 3.0%

Si is an element necessary to increase the TS through solid solution strengthening and controlling tempering of martensite and to obtain excellent delayed fracture resistance. To obtain the above effects, the amount of Si must be 0.01% or more. The amount of Si is preferably 0.1% or more and more preferably 0.2% or more. If the amount of Si exceeds 3.0%, an excessively large amount of ferrite is formed, and the steel microstructure of the steel sheet according to the present embodiment is not obtained. Therefore, the amount of Si must be 3.0% or less. The amount of Si is preferably 2.5% or less and more preferably 2.0% or less.

Mn: 2.0 to 4.0%

Mn is an element effective in increasing the TS through the formation of martensite and bainite containing carbides. If the amount of Mn is less than 2.0%, the above effect is not obtained. Therefore, the amount of Mn must be 2.0% or more. The amount of Mn is preferably 2.1% or more and more preferably 2.2% or more. If the amount of Mn exceeds 4.0%, embrittlement of the steel occurs, and the delayed fracture resistance of the steel sheet according to the present embodiment is not obtained. Therefore, the amount of Mn must be 4.0% or less. The amount of Mn is preferably 3.7% or less and more preferably 3.4% or less.

P: 0.010% or Less (Excluding 0)

P causes embrittlement of grain boundaries to thereby deteriorate the delayed fracture resistance, so that it is desirable to reduce the amount of P as much as possible. However, in the steel sheet according to the present embodiment, the allowable amount of P is 0.010%. It is unnecessary to specify the lower limit of the amount of P. To reduce the amount of P in the steel sheet to less than 0.0005%, a large load is imposed on the refining process of the steel, causing a reduction in production efficiency. Therefore, the lower limit of the amount of P is preferably 0.0005%.

S: 0.002% or Less (Excluding 0)

S increases the amount of inclusions to thereby deteriorate the delayed fracture resistance. It is therefore desirable to reduce the amount of S as much as possible. In the steel sheet according to the present embodiment, the allowable amount of S is 0.002%. It is unnecessary to specify the lower limit of the amount of S. To reduce the amount of S to less than 0.0001%, a large load is imposed on the refining process of the steel, causing a reduction in production efficiency. Therefore, the lower limit of the amount of S is preferably 0.0001%.

Al: 0.01 to 1.50%

Al serves as a deoxidizer, and it is therefore preferable to add Al in a deoxidizing step. To obtain the above effect, the amount of Al must be 0.01% or more. The amount of Al is preferably 0.015% or more. If the amount of Al exceeds 1.50%, an excessively large amount of ferrite is formed, and the steel microstructure of the steel sheet according to the present embodiment is not obtained. Therefore, the amount of Al must be 1.50% or less. The amount of Al is preferably 1.00% or less and more preferably 0.70% or less.

B: 0.0005 to 0.010%

B improves the delayed fracture resistance and is therefore an important element for the steel sheet according to the present embodiment. It is inferred that B segregates at prior-austenite grain boundaries etc. to strengthen the grain boundaries, but the mechanism of this is unclear. B is also an element that increases the hardenability of the steel sheet, allows martensite and bainite to be formed, and is effective in increasing the strength of the steel sheet. To obtain these effects sufficiently, the amount of B must be 0.0005% or more. The amount of B is preferably 0.0007% or more. If the amount of B exceeds 0.010%, the amount of inclusions increases, and the delayed fracture resistance deteriorates. Therefore, the amount of B must be 0.010% or less. The amount of B is preferably 0.0050% or less and more preferably 0.0040% or less.

One or more selected from Mo: 0.03 to 2.0% and Ti: 0.010 to 0.10%

Mo and Ti are elements necessary to prevent carbonization and nitriding of B in order to allow the above effects of solute B to be obtained. To obtain the above effect, the amount of one or more selected from Mo and Ti must be equal to or more than the following lower limits. If the amounts of Mo and Ti exceed their upper limits, a coarse carbide is formed, and the amount of solute C decreases. In this case, the steel microstructure of the steel sheet according to the present embodiment is not obtained. Therefore, it is necessary to contain one or more selected from Mo: 0.03% or more and 2.0% or less and Ti: 0.010% or more and 0.10% or less.

The steel sheet according to the present embodiment may further optionally contain one or more selected from the following elements.

Nb: 0.005 to 0.20% and V: 0.005 to 2.0%

Nb and V are elements effective in increasing the strength through the formation of fine carbides. To obtain the above effect, the amount of one or more selected from Nb and V is preferably 0.005% or more. If the contents of Nb and V exceed their upper limits, the amount of solute carbon in the steel decreases, and a large amount of ferrite is formed. In this case, the steel microstructure of the steel sheet according to the present embodiment may not be obtained. Therefore, the content of one or more selected from Nb and V is preferably Nb: 0.005% or more and 0.20% or less or V: 0.005% or more and 2.0% or less.

Cr: 0.005 to 2.0%, Ni: 0.005 to 2.0%, Cu: 0.005 to 2.0%, Ca: 0.0002 to 0.0050%, REMs: 0.0002 to 0.0050%, Sn: 0.001 to 0.05%, and Sb: 0.001 to 0.05%

Cr, Ni, and Cu are elements effective in increasing the strength through the formation of martensite and bainite. To obtain the above effect, the amounts of Cr, Ni, and Cu are preferably 0.005% or more. If the amounts of Cr, Ni, and Cu exceed 2.0%, embrittlement of grain boundaries occurs, and the delayed fracture resistance of the steel sheet according to the present embodiment may not be obtained. Therefore, the amounts of Cr, Ni, and Cu are preferably 2.0% or less.

Ca and REMs are elements effective in improving the delayed fracture resistance through chape control of inclusions. To obtain the above effect, the amounts of Ca and REMs are preferably 0.0002% or more. If the amounts of Ca and REMs exceed 0.0050%, the amount of inclusions increases, and the delayed fracture resistance may deteriorate. Therefore, the amounts of Ca and REMs are preferable 0.0050% or less.

Sn and Sb are elements that prevent denitrification, deboronation, etc., and are effective in preventing a reduction in the strength of the steel. To obtain the above effect, the amounts of Sn and Sb are preferably 0.001% or more. If the amounts of Sn and Sb exceed 0.05%, embrittlement of the prior-austenite grain boundaries occurs, and the delayed fracture resistance may deteriorate. Therefore, the amounts of Sn and Sb are preferably 0.05% or less.

Accordingly, the contents of Cr, Ni, Cu, Ca, REMs, Sn, and Sb are preferably Cr: 0.005 to 2.0%, Ni: 0.005 to 2.0%, Cu: 0.005 to 2.0%, Ca: 0.0002 to 0.0050%, REMs: 0.0002 to 0.0050%, Sb: 0.001 to 0.05%, and Sn: 0.001 to 0.05%.

The steel sheet according to the present embodiment has the above-described chemical composition, and the balance other than the above components is iron (Fe) and unavoidable impurities. The balance is preferably Fe and unavoidable impurities. When the steel sheet contains some of the above optional components in amounts lower than their lower limits, these optional components are considered to be contained as unavoidable impurities. N may be contained as an unavoidable impurity in an amount of 0.01% or less. Other elements such as Zr, Mg, La, and Ce may be contained in a total amount of 0.002% or less.

Next, the steel microstructure of the steel sheet according to the present embodiment will be described. In a region extending from 300 to 400 μm from a surface layer of the steel sheet according to the present embodiment in its thickness direction, the total area fraction of martensite and bainite containing carbides is 60 to 100%, and the average grain size of prior austenite is 15 μm or less. In the region extending from 300 to 400 μm from the surface layer of the steel sheet in its thickness direction, the ratio of the height of a peak of P in an Auger electron spectrum at a position 5 nm or more from a prior-austenite grain boundary to the height of a peak of P in an Auger electron spectrum at the prior-austenite grain boundary is 0.20 or more. The surface layer of the steel sheet means the boundary between a hot-dip galvanized layer and the steel sheet.

Total of Martensite and Bainite Containing Carbides: 60 to 100%

Martensite and bainite containing carbides are microstructures necessary for increasing the TS and obtaining excellent delayed fracture resistance. To obtain these effects, the total area fraction of the martensite and the bainite containing carbides must be 60% or more. The total of the martensite and the bainite containing carbides is preferably 75% or more and more preferably 90% or more. The upper limit of the total of the martensite and the bainite containing carbides is 100%.

Average Crystal Grain Size of Prior Austenite: 15 μm or Less

In prior austenite, segregation of P occurs significantly, and this has a large influence on the occurrence of delayed fracture. When the average crystal grain size of the prior austenite is 15 μm or less, stress concentration on the grain boundaries is reduced, and the delayed fracture resistance of the steel sheet according to the present embodiment is obtained. Therefore, the average crystal grain size of the prior austenite must be 15 μm or less. The average crystal grain size of the prior austenite is preferably 12 μm or less, more preferably 10 μm or less, and still more preferably 9 μm or less.

Ratio of height of peak of P in Auger electron spectrum at position 5 nm or more from prior-austenite grain boundary to height of peak of P in Auger electron spectrum at prior-austenite grain boundary: 0.20 or more Segregation of P at prior-austenite grain boundaries causes significant deterioration in delayed fracture resistance, so that prevention of the segregation is very important. The ratio of the height of a peak of P in an Auger electron spectrum at a position 5 nm or more from a prior-austenite grain boundary to the height of a peak of P in an Auger electron spectrum at the prior-austenite grain boundary is used as the indicator of the grain boundary segregation of P. If the above ratio is less than 0.20, delayed fracture occurs at the prior-austenite grain boundaries, and therefore the excellent delayed fracture resistance of the steel sheet according to the present embodiment is not obtained. Therefore, the ratio of the height of the peak of P in an Auger electron spectrum at a position 5 nm or more from a prior-austenite grain boundary to the height of the peak of P in an Auger electron spectrum at the prior-austenite grain boundary must be 0.20 or more. The ratio of the height of the peak of P in an Auger electron spectrum at a position 5 nm or more from a prior-austenite grain boundary to the height of the peak of P in an Auger electron spectrum at the prior-austenite grain boundary is preferably 0.30 or more, more preferably 0.35 or more, and still more preferably 0.40 or more.

The ratio of the height of the peak of P in an Auger electron spectrum at a position 5 nm or more from a prior-austenite grain boundary to the height of the peak of P in an Auger electron spectrum at the prior-austenite grain boundary can be computed using the following formula (2).

$$\text{(The height of the peak of } P \text{ in an Auger electron spectrum at a position 5 nm or more from a prior-austenite grain boundary)} / \text{(the height of the peak of } P \text{ in an Auger electron spectrum at the prior-austenite grain boundary)} \quad (2)$$

The height of the peak of P in an Auger electron spectrum was measured using an Auger electron spectrometer, and a sample for rupture having a notch was used as a specimen. The sample was ruptured in a vacuum chamber of the Auger electron spectrometer, and a fracture surface was analyzed to measure the heights of peaks of P. The sample was ruptured under cooling conditions using liquid nitrogen. The analysis was performed using Ar ion sputtering.

In the present embodiment, the area fraction of martensite and the area fraction of bainite containing carbides are the ratios of the areas of these microstructures to the observation area. These area fractions are determined as follows. A sample is cut from an annealed steel sheet, and a thickness-wise cross section of the steel sheet that is parallel to the rolling direction is polished and etched with 1 mass % nital. Then, in each of a region near the surface of the steel sheet and a region extending from 300 μm to 400 μm from the surface of the steel sheet in its thickness direction, images of 3 to 10 viewing areas are taken using an SEM (scanning electron microscope) at a magnification of 1500×. The area fractions of microstructures in the obtained image data are determined using Image-Pro manufactured by Media Cybernetics, and the averages of the area fractions in these viewing areas are used as the area fractions of the microstructures.

In the image data, bainite containing carbide particles can be distinguished because it appears as gray or dark gray regions including the carbides with aligned orientations at $10^7$ particles/mm$^2$ or more. Martensite can be distinguished because it appears as dark gray, gray, or bright gray regions including carbides with non-aligned orientations or white block including no carbides. Retained austenite appears also as white massive regions but can be distinguished from martensite by using a method described later. Carbides can be distinguished because they appear as white dots or lines. Ferrite and bainite containing no carbides can be distinguished because they appear as black or dark gray regions, and pearlite can be distinguished because it appears as a black and white lamellar structure.

The average crystal grain size of prior austenite is determined as follows. The cross section of the sample used for the microstructure observation is re-polished and etched with, for example, a solution mixture of picric acid and ferric chloride to allow prior-austenite grain boundaries to appear. Then images of 3 to 10 viewing areas are taken under an optical microscope at a magnification of 400×. In the image data obtained, 20 straight lines including 10 vertical lines and 10 horizontal lines are drawn at regular intervals, and the average crystal grain size is determined using an intercept method.

The area fraction of the retained austenite is determined as follows. An annealed steel sheet is ground to a depth of one-fourth of the thickness of the sheet and then further polished by 0.1 mm by chemical polishing. Next, on the polished surface, the Mo Kα line of an X-ray diffractometer is used to measure integrated reflection intensities of (200), (220), and (311) planes of fcc iron (austenite) and (200), (211), and (220) planes of bcc iron (ferrite). The volume fraction of the retained austenite is determined from the intensity ratios of the integrated reflection intensities of the above respective planes of fcc iron to the integrated reflection intensities of the above respective planes of bcc iron and is used as the area fraction of the retained austenite. By computing the area fraction of the retained austenite in the manner described above, the retained austenite is distinguished from the martensite.

Next, a method for manufacturing the steel sheet according to the present embodiment will be described. The steel sheet according to the present embodiment is produced, for example, by: subjecting a slab containing the above-described components to hot rolling and coiling to thereby produce a hot-rolled sheet; pickling the hot-rolled sheet; cold-rolling the resulting hot-rolled sheet; subjecting the cold-rolled sheet to annealing including heating to 750 to 950° C., holding for 10 to 600 s, then cooling to 550° C. or lower at an average cooling rate of 3° C./s or higher, and holding at Ms temperature to 550° C. for 300 s or shorter; subjecting the annealed sheet to hot-dip galvanizing treatment; optionally subjecting the galvanized sheet to galvannealing treatment; cooling the resulting sheet to the Ms temperature at an average cooling rate of 1° C./s or higher;

and then subjecting the resulting sheet to a cooling step such that the following formula (1) is satisfied, wherein, in the cooling step, a strain of more than 0% and 0.067% or less is imparted to the resulting sheet at 250° C. to the Ms temperature.

$$\text{Log}_e([P]\times[C]\times(8.65-474\times D_A\times[B])\times t)+35.4 \geq 13320/(273+T)+4831/(273+T-100\times[Si]) \quad (1)$$

In formula (1) above, when $D_A \times [B] \geq 0.00912$, $D_A \times [B]$ is set to 0.00912. [P], [C], [B], and [Si] in formula (1) above are the contents (% by mass) of P, C, B, and Si, respectively, in the steel. $D_A$ is the grain size (μm) of prior austenite, and T is retention temperature (° C.). t is a total retention time (s) at the retention temperature.

Alternatively, the steel sheet is produced by: subjecting a slab containing the above-described components to hot rolling, cooling, and coiling to thereby produce a hot-rolled sheet; pickling the hot-rolled sheet; tempering the resulting hot-rolled sheet under the condition of a maximum temperature of lower than 400° C.; cold-rolling the resulting hot-rolled sheet at a rolling reduction of 70% or more; subjecting the cold-rolled sheet to annealing including heating to 750 to 950° C., holding for 10 to 600 s, cooling to 550° C. or lower at an average cooling rate of 3° C./s or higher, and holding at Ms temperature to 550° C. for 300 s or shorter; subjecting the annealed sheet to hot-dip galvanizing treatment; optionally subjecting the galvanized sheet to galvannealing treatment; cooling the resulting sheet to the Ms temperature at an average cooling rate of 1° C./s or higher; and then subjecting the resulting sheet to a subsequent step such that formula (1) above is satisfied, wherein, in the subsequent step, a strain of more than 0% and 0.067% or less is imparted to the resulting sheet at 250° C. to the Ms temperature. The temperatures in the production conditions are each the surface temperature of the steel sheet. The production methods will be described in more detail.

Annealing Temperature: 750 to 950° C.

If the annealing temperature is lower than 750° C., the formation of austenite is insufficient, so that the steel microstructure of the steel sheet according to the present embodiment is not obtained. Therefore, the annealing temperature must be 750° C. or higher. If the annealing temperature exceeds 950° C., coarse grains are formed, and the steel microstructure of the steel sheet according to the present embodiment is not obtained. Therefore, the annealing temperature must be 950° C. or lower.

Annealing Holding Time: 10 to 600 s

If the annealing holding time is shorter than 10 s, the formation of austenite is insufficient, so that the steel microstructure of the steel sheet according to the present embodiment is not obtained. Therefore, the annealing holding time must be 10 s or longer. The annealing holding time is preferably 20 s or longer and more preferably 30 s or longer. If the annealing holding time exceeds 600 s, excessive segregation of P at the austenite grain boundaries occurs, so that the delayed fracture resistance of the steel sheet according to the present embodiment is not obtained. Therefore, the annealing holding time must be 600 s or shorter. The annealing holding time is preferably 500 s or shorter and more preferably 400 s or shorter.

Average Cooling Rate in Range of from Annealing Temperature to 550° C.: 3° C./s or Higher If the average cooling rate in the range of from the annealing temperature to 550° C. is less than 3° C./s, an excessively large amount of ferrite is formed, so that the steel microstructure of the steel sheet according to the present embodiment cannot be obtained. Therefore, the average cooling rate in the range of from the annealing temperature to 550° C. must be 3° C./s or higher. The average cooling rate in the range of from the annealing temperature to 550° C. is preferably 5° C./s or higher. It is unnecessary to specify the upper limit of the average cooling rate in the range of from the annealing temperature to 550° C. However, from the viewpoint of shape stability, the upper limit is preferably lower than 100° C./s. The average cooling rate is computed by dividing the temperature difference between the annealing temperature and 550° C. by the time required to cool the steel sheet from the annealing temperature to 550° C.

Holding Temperature: Ms Temperature to 550° C.

If the holding temperature exceeds 550° C., ferrite is formed, so that the steel microstructure of the steel sheet according to the present embodiment is not obtained. Therefore, the holding temperature must be 550° C. or lower. If the holding temperature is lower than the Ms temperature, martensite transformation and bainite transformation proceed excessively, so that the P distribution in the steel sheet according to the present embodiment is not obtained. Therefore, the holding temperature must be equal to or higher than the Ms temperature. The MS temperature is a temperature at which the martensite transformation starts and can be determined using a formastor.

Holding Time at Ms Temperature to 550° C.: 300 s or Shorter

If the holding time at the Ms temperature or higher and 550° C. or lower exceeds 300 s, an excessively large amount of bainite containing no carbides is formed, so that the steel microstructure of the steel sheet according to the present embodiment is not obtained. Therefore, the holding time at the Ms temperature or higher and 550° C. or lower must be 300 s or shorter. The holding time at the Ms temperature or higher and 550° C. or lower is preferably 200 s or shorter and more preferably 120 s or shorter. It is unnecessary that the temperature during holding be constant so long as the temperature is in the range of from the Ms temperature to 550° C., and the steel sheet may be cooled or heated.

Average Cooling Rate During Cooling to Ms Temperature: 1° C./s or Higher

If the average cooling rate during cooling to the Ms temperature is lower than 1° C./s, the bainite transformation proceeds excessively during cooling, so that the P distribution in the steel sheet according to the present embodiment is not obtained. Therefore, the average cooling rate until the Ms temperature must be 1° C./s or higher. The average cooling rate is computed by dividing the temperature difference between the cooling start temperature and the Ms temperature by the time required to cool from the cooling start temperature to the Ms temperature.

Strain Imparted at 250° C. to Ms Temperature: More Than 0% and 0.067% or Less

By imparting strain during the martensite transformation, segregation of P at the prior-austenite grain boundaries can be reduced. However, if the strain imparted exceeds 0.067%, the amount of P segregation increases, so that the P distribution in the steel sheet according to the present embodiment is not obtained. Even when strain is imparted in a temperature range of lower than 250° C., the above effect is not obtained. Therefore, a strain of more than 0.000% and 0.067% or less must be imparted at 250° C. or higher and the Ms temperature or lower. The lower limit of the strain imparted at 250° C. or higher and the Ms temperature or lower is preferably 0.010%. No particular limitation is imposed on the method for imparting the strain, and the strain may be imparted by applying tension, by using rolls or the like, and by bending.

In the cooling step after the cooling to the Ms temperature at an average cooling rate of 1° C./s or higher, the following formula (1) is satisfied.

$$\mathrm{Log}_e([P]\times[C]\times(8.65-474\times D_A\times[B])\times t)+35.4\geq 13320/(273+T)+4831/(273+T-100\times[Si]) \quad (1)$$

In formula (1) above, when $D_A \times [B] \geq 0.00912$, $D_A \times [B]$ is set to 0.00912. [P], [C], [B], and [Si] in formula (1) above are the contents (% by mass) of P, C, B, and Si, respectively, in the steel. $D_A$ is the grain size (μm) of prior austenite. T is the retention temperature (° C.), and t is the total retention time (s) at the retention temperature.

When formula (1) is satisfied in the cooling step after the cooling to the Ms temperature at an average cooling rate of 1° C./s or higher, segregation of P at the prior-austenite grain boundaries is reduced, and the excellent delayed fracture resistance of the steel sheet according to the embodiment is obtained. The steel sheet may be held isothermally or re-heated so long as formula (1) is satisfied in the cooling step after the cooling to the Ms temperature at an average cooling rate of 1° C./s or higher. Whether or not formula (1) is satisfied in the cooling step after the cooling to the Ms temperature at an average cooling rate of 1° C./s or higher may be determined, for example, as follows. When the steel sheet is cooled continuously at K° C./s, it is assumed that the steel sheet is held for 1/K seconds at each temperature. Then the value of formula (1) is computed in steps of 1° C. to check whether or not formula (1) is satisfied.

Maximum Tempering Temperature: Lower Than 400° C.

In the present embodiment, heat treatment may be performed on the hot-rolled sheet before the cold rolling for the purpose of improving cold rollability etc. In this case, if the maximum temperature during the heat treatment of the hot-rolled sheet is 400° C. or higher, segregation of P at the prior-austenite grain boundaries in the microstructure of the hot-rolled sheet occurs significantly. The segregation of P is not reduced by the cold rolling. The segregation of P remains present during the subsequent annealing, and the delayed fracture resistance deteriorates. Therefore, when the hot-rolled sheet is subjected to the heat treatment, the maximum temperature must be lower than 400° C. It is unnecessary to specify the lower limit temperature. However, to soften the hot-rolled sheet, the lower limit temperature is preferably 100° C. or higher.

Cold Rolling Reduction: 70% or More

In the case where the heat treatment of the hot-rolled sheet under the condition of a maximum temperature of lower than 400° C., it is necessary to cold roll the resulting sheet at a rolling reduction of 70% or more. If the rolling reduction of the cold rolling is less than 70%, the segregation of P at the prior austenite grain boundaries that has occurred during the heat treatment of the hot-rolled sheet is not reduced sufficiently, and the delayed fracture resistance in Examples described later deteriorates. Therefore, the cold rolling reduction when the hot-rolled sheet is subjected to the heat treatment under the above condition must be 70% or more.

No particular limitation is imposed on the other manufacturing conditions. The steel sheet may be manufactured, for example, under the following conditions. Preferably, the slab is manufactured by a continuous casting method in order to prevent macro segregation. The slab may be manufactured by an ingot-making method or a thin slab casting method. When the slab is hot-rolled, the slab may be first cooled to room temperature, then reheated, and hot-rolled. The slab may be placed in a heating furnace without cooling to room temperature and then hot-rolled. Alternatively, an energy-saving process may be used, in which the slab is hot-rolled directly after short heat retaining treatment. When the slab is heated, it is preferable to heat the slab to 1100° C. or higher and 1300° C. or lower. By heating the slab to a temperature of 1100° C. or higher, carbides can be dissolved, and an increase in rolling load can be prevented. By setting the slab temperature to 1300° C. or lower, an increase in scale loss can be prevented. The slab temperature is represented by the temperature of the surface of the slab.

When the slab is hot-rolled, a rough bar prepared by rough-rolling the slab may be heated. A so-called continuous rolling process may be employed, in which rough bars are joined together and then subjected to continuous finishing rolling. Further, in the hot rolling, in order to reduce the rolling load and to make the shape and material properties of the hot-rolled product uniform, it is preferable that lubrication rolling that allows the coefficient of friction to be 0.10 to 0.25 is performed in all or part of passes of the finishing rolling.

The coiled steel sheet may be, for example, pickled to remove scales, then cold-rolled, annealed, and subjected to hot-dip galvanization. It is preferable that, after the galvanization, the resulting steel sheet is cooled to room temperature and subjected to temper rolling at an elongation rate of 1% or less in order to control the surface and the yield strength (YS). If necessary, tempering treatment may be performed within the range in which formula (1) is satisfied. The temperature of the tempering treatment is preferably 200° C. or lower. To control the shape and YS, levelling may be performed.

EXAMPLES

The present invention will be specifically described by way of Examples. Molten steel (the balance being Fe and unavoidable impurities) was produced using a vacuum melting furnace in a laboratory and slabs were obtained therefrom through rolling. The chemical compositions of the steel are shown in Table 1.

TABLE 1

| | Chemical composition (% by mass) | | | | | | | | | | |
|---|---|---|---|---|---|---|---|---|---|---|---|
| Steel | C | Si | Mn | P | S | Al | B | Mo | Ti | Others | Remarks |
| A | 0.16 | 2.0 | 3.5 | 0.008 | 0.0015 | 0.03 | 0.0015 | 0.05 | — | — | Within inventive range |
| B | 0.20 | 1.5 | 3.5 | 0.010 | 0.0010 | 0.03 | 0.0020 | — | 0.015 | — | Within inventive range |
| C | 0.24 | 1.0 | 3.5 | 0.005 | 0.0005 | 0.03 | 0.0005 | 0.03 | 0.020 | Nb: 0.015 | Within inventive range |
| D | 0.28 | 0.8 | 3.5 | 0.002 | 0.0010 | 0.03 | 0.0030 | 0.20 | 0.010 | V: 0.10 | Within inventive range |
| E | 0.32 | 0.6 | 3.5 | 0.005 | 0.0010 | 0.03 | 0.0010 | 0.08 | 0.005 | Cr: 0.5 | Within inventive range |
| F | 0.13 | 0.3 | 3.5 | 0.005 | 0.0010 | 0.03 | 0.0025 | 0.10 | 0.015 | Ni: 0.5, Cu: 0.5 | Within inventive range |
| G | 0.10 | 0.6 | 3.5 | 0.005 | 0.0010 | 0.03 | 0.0040 | 0.15 | 0.030 | Ca: 0.0010 | Within inventive range |
| H | 0.20 | 0.6 | 2.5 | 0.005 | 0.0010 | 0.03 | 0.0020 | 0.40 | 0.025 | REM: 0.0020 | Within inventive range |

TABLE 1-continued

| | Chemical composition (% by mass) | | | | | | | | | | |
|---|---|---|---|---|---|---|---|---|---|---|---|
| Steel | C | Si | Mn | P | S | Al | B | Mo | Ti | Others | Remarks |
| I | 0.20 | 0.6 | 3.5 | 0.005 | 0.0010 | 0.30 | 0.0020 | 0.10 | — | Sn: 0.010 | Within inventive range |
| J | 0.20 | 0.6 | 3.0 | 0.005 | 0.0010 | 0.03 | 0.0020 | — | 0.025 | Sb: 0.005 | Within inventive range |
| K | 0.07 | 1.3 | 3.5 | 0.005 | 0.0010 | 0.03 | 0.0020 | 0.15 | — | — | Outside inventive range |
| L | 0.36 | 1.3 | 3.0 | 0.005 | 0.0010 | 0.03 | 0.0020 | 0.15 | — | — | Outside inventive range |
| M | 0.20 | 3.5 | 3.0 | 0.005 | 0.0010 | 0.03 | 0.0020 | — | 0.020 | — | Outside inventive range |
| N | 0.20 | 1.3 | 1.8 | 0.005 | 0.0010 | 0.03 | 0.0020 | 0.20 | 0.020 | — | Outside inventive range |
| O | 0.20 | 1.3 | 4.5 | 0.005 | 0.0010 | 0.03 | 0.0020 | — | 0.010 | — | Outside inventive range |
| P | 0.20 | 1.3 | 3.5 | 0.005 | 0.0010 | 0.03 | — | 0.05 | 0.020 | — | Outside inventive range |
| Q | 0.20 | 1.3 | 3.5 | 0.005 | 0.0010 | 0.03 | 0.0015 | 0.01 | 0.002 | — | Outside inventive range |
| R | 0.20 | 1.3 | 3.5 | 0.011 | 0.0010 | 0.03 | 0.0015 | — | 0.020 | — | Outside inventive range |

Each of these steel slabs was heated to 1250° C. and subjected to rough rolling and hot rolling, and the hot-rolled sheet was subjected to heat treatment. Next, the hot-rolled sheet was cold-rolled to 1.4 mm to obtain a cold-rolled sheet. The obtained cold-rolled sheet was annealed. The annealing was performed using a heat treatment and galvanization apparatus in the laboratory to produce hot-dip galvanized steel sheets (GI) and hot-dip galvannealed steel sheets (GA) 1 to 31. Each hot-dip galvanized steel sheet was produced by immersing a steel sheet in a galvanizing bath at 465° C. to form a coated layer on both sides of the steel sheet such that the coating weight per side was 40 to 60 g/m². Each hot-dip galvannealed steel sheet was produced by, after the galvanization, subjecting one of the hot-dip galvanized steel sheets to galvannealing treatment in which the steel sheet was held at 540° C. for 1 to 60 s. After the coating treatment, the resulting steel sheet was cooled to room temperature and then subjected to temper rolling at an elongation rate of 0.1% or less. The cooling to the Ms temperature after the coating treatment was performed at an average cooling rate of 3° C./s. Some of the steel sheets after the temper rolling were further subjected to tempering heat treatment. Strain was imparted by applying tension. The manufacturing conditions of the hot-dip galvanized steel sheets and the hot-dip galvannealed steel sheets are shown in Table 2. A steel sheet 18 reached the Ms temperature or lower before galvanization was performed. Therefore, this steel sheet was not subjected to the measurement of the amount of strain after galvanization, and "–" was placed in the "Amount of strain imparted at 250° C. to Ms" column of Table 2. $D_A$ (prior austenite grain size) in formula (1) was determined by measuring the sizes of prior austenite grains in a ¼t portion in a cross section in the rolling direction obtained from a widthwise central portion of the steel sheet according to the specifications of JIS (Japanese Industrial Standards) G 0551: 2013. "○" in the "Whether formula (1) is satisfied" column of Table 2 means that formula (1) is satisfied, and "×" means that formula (1) is not satisfied.

TABLE 2

| Steel sheet No. | Steel | Hot rolling conditions - Finishing rolling temperature (°C) | Hot rolling conditions - Coiling temperature (°C) | Conditions for heat treatment after hot rolling - Maximum temperature (°C) | Conditions for heat treatment after hot rolling - Holding time (s) | Cold rolling condition - Cold rolling reduction (%) | Annealing conditions - Annealing temperature (°C) | Annealing time (s) | Average cooling rate *1 (°C/s) | Cooling stop temperature (°C) | Re-heating temperature (°C) | Holding time *2 (s) | Galvan-nealing | Amount of strain imparted at 250° C. to Ms (%) | Whether formula (1) is satisfied *3 | Tempering temperature (°C) | Tempering time (s) | MS (°C) | Remarks |
|---|---|---|---|---|---|---|---|---|---|---|---|---|---|---|---|---|---|---|---|
| 1 | A | 900 | 500 | 380 | 14400 | 75 | 900 | 100 | 100 | 500 | — | 100 | Yes | 0.065 | ○ | — | — | 349 | Inventive Example |
| 2 | | 900 | 500 | 420 | 14400 | 75 | 900 | 100 | 100 | 500 | — | 100 | Yes | 0.065 | ○ | — | — | 352 | Comparative Example |
| 3 | | 900 | 500 | 380 | 14400 | 60 | 900 | 100 | 100 | 500 | — | 100 | Yes | 0.065 | ○ | — | — | 350 | Comparative Example |
| 4 | B | 930 | 400 | — | — | 40 | 850 | 200 | 20 | 550 | — | 10 | Yes | 0.005 | ○ | — | — | 335 | Inventive Example |
| 5 | | 930 | 400 | — | — | 40 | 740 | 200 | 20 | 550 | — | 10 | Yes | 0.005 | ○ | — | — | 255 | Comparative Example |
| 6 | | 930 | 400 | — | — | 40 | 970 | 200 | 20 | 550 | — | 10 | Yes | 0.005 | ○ | — | — | 337 | Comparative Example |
| 7 | C | 850 | 550 | 200 | 14400 | 75 | 850 | 200 | 20 | 500 | — | 50 | Yes | 0.010 | ○ | — | — | 324 | Inventive Example |
| 8 | | 850 | 550 | 200 | 14400 | 75 | 850 | 5 | 20 | 500 | — | 50 | Yes | 0.010 | ○ | — | — | 274 | Comparative Example |
| 9 | | 850 | 550 | 200 | 14400 | 75 | 850 | 900 | 20 | 500 | — | 50 | Yes | 0.010 | ○ | — | — | 320 | Comparative Example |
| 10 | D | 900 | 600 | — | — | 50 | 900 | 30 | 20 | 450 | — | 20 | Yes | 0.030 | ○ | — | — | 308 | Inventive Example |
| 11 | | 900 | 600 | — | — | 50 | 900 | 30 | 10 | 450 | — | 600 | Yes | 0.030 | ○ | — | — | 257 | Comparative Example |
| 12 | | 900 | 600 | — | — | 50 | 900 | 30 | 10 | 450 | 500 | 20 | Yes | 0.030 | X | — | — | 308 | Comparative Example |
| 13 | E | 900 | 650 | — | — | 50 | 770 | 480 | 20 | 500 | 500 | 200 | Yes | 0.010 | ○ | — | — | 290 | Inventive Example |
| 14 | | 900 | 650 | — | — | 50 | 770 | 480 | 20 | 500 | 500 | 200 | Yes | 0.010 | X | — | — | 295 | Comparative Example |
| 15 | | 900 | 650 | — | — | 50 | 770 | 480 | 20 | 500 | — | 200 | Yes | 0 | ○ | — | — | 292 | Comparative Example |
| 16 | F | 900 | 500 | — | — | 50 | 850 | 50 | 5 | 500 | — | 100 | No | 0.010 | ○ | — | — | 375 | Inventive Example |
| 17 | | 900 | 500 | — | — | 50 | 850 | 50 | 2 | 500 | — | 100 | No | 0.010 | ○ | — | — | 346 | Comparative Example |
| 18 | | 900 | 500 | — | — | 50 | 850 | 50 | 5 | 350 | 500 | 100 | No | — | ○ | — | — | 375 | Comparative Example |
| 19 | G | 900 | 500 | — | — | 50 | 810 | 200 | 30 | 500 | — | 30 | Yes | 0.010 | ○ | — | — | 372 | Inventive Example |
| 20 | | 900 | 500 | — | — | 50 | 810 | 200 | 30 | 500 | — | 30 | Yes | 0.100 | ○ | — | — | 374 | Comparative Example |
| 21 | H | 900 | 500 | — | — | 50 | 850 | 200 | 30 | 400 | 450 | 10 | Yes | 0.010 | ○ | 200 | 60 | 374 | Inventive Example |
| 22 | I | 900 | 500 | — | — | 50 | 850 | 200 | 30 | 400 | 450 | 10 | Yes | 0.010 | ○ | 290 | 60 | 344 | Inventive Example |
| 23 | J | 900 | 500 | — | — | 50 | 900 | 200 | 10 | 500 | — | 10 | Yes | 0.010 | ○ | 200 | 60 | 359 | Inventive Example |
| 24 | K | 900 | 500 | — | — | 50 | 850 | 200 | 20 | 500 | — | 30 | Yes | 0.010 | ○ | — | — | 376 | Comparative Example |
| 25 | L | 900 | 500 | — | — | 50 | 850 | 200 | 20 | 500 | — | 30 | Yes | 0.010 | ○ | — | — | 286 | Comparative Example |
| 26 | M | 900 | 500 | — | — | 50 | 850 | 200 | 20 | 500 | — | 30 | Yes | 0.010 | ○ | — | — | 291 | Comparative Example |
| 27 | N | 900 | 500 | — | — | 50 | 900 | 200 | 20 | 500 | — | 30 | Yes | 0.010 | ○ | — | — | 305 | Comparative Example |
| 28 | O | 900 | 500 | — | — | 50 | 850 | 200 | 20 | 500 | — | 30 | Yes | 0.010 | ○ | — | — | 308 | Comparative Example |
| 29 | P | 900 | 500 | — | — | 50 | 940 | 200 | 20 | 500 | — | 30 | Yes | 0.010 | ○ | — | — | 338 | Comparative Example |
| 30 | Q | 900 | 500 | — | — | 50 | 900 | 200 | 20 | 500 | — | 30 | Yes | 0.010 | ○ | — | — | 340 | Comparative Example |
| 31 | R | 900 | 500 | — | — | 50 | 850 | 200 | 20 | 500 | — | 30 | Yes | 0.010 | ○ | — | — | 341 | Comparative Example |

*1 The average cooling rate in the range of annealing temperature to 550° C.
*2 The holding time at the cooling stop temperate or the holding time at the re-heating temperature when re-heating is performed.
*3 Formula (1): Log$e$[P] × [C] × (8.65 − 474 × $D_A$ × [B] × t) + 35.4 ≥ 13320/(273 + T) + 4831/(273 + T) − 100 × [Si])

For each of the obtained hot-dip galvanized steel sheets and hot-dip galvannealed steel sheets, its tensile characteristics and delayed fracture resistance were evaluated using the following test methods.

<Tensile Test>

A JIS (Japanese Industrial Standards) No. 5 tensile test piece (JIS Z2201:1998) was taken from each annealed sheet in a direction perpendicular to the rolling direction, and a tensile test was performed according to the specifications of JIS (Japanese Industrial Standards) Z 2241:2011 with a strain rate of $10^{-3}$/s to determine the TS. In the Examples, a sheet with a TS of 1100 MPa or more was rated pass.

<Delayed Fracture Resistance>

Test pieces each having a parallel portion with a width of 6 mm and a length of 15 mm were taken from each annealed sheet such that a direction parallel to the rolling direction was the width direction. The entire surfaces of the test pieces were ground so that the test pieces with a thickness of 1.0 mm might be evaluated. Each test piece was immersed in 3% by mass NaCl solution and 3 g/l NH$_4$SCN solution and held for 24 hours at an applied current density of 0 or 0.05 mA/cm$^2$. Then an SSRT test with a cross head speed of 5 μm/min was started. The test was stopped when the test piece was ruptured. A stress ratio is defined as the ratio of the TS under the condition of an applied current density of 0.05 mA/cm$^2$ to the TS under the condition of an applied current density of 0 mA/cm$^2$. When the stress ratio was 0.70 or more, the delayed fracture resistance was rated "○." When the stress ratio was less than 0.70, the delayed fracture resistance was rated "×."

The steel microstructure, the average grain size of prior austenite, and the ratio of the height of the peak of P in an Auger electron spectrum at a position 5 nm or more from a prior-austenite grain boundary to the height of the peak of P in an Auger electron spectrum at the prior-austenite grain boundary were measured by the methods described above. The results of the evaluation, the steel microstructures of the steel sheets, etc. are shown in Table 3.

TABLE 3

| Steel sheet No. | Steel microstructure | | | Tensile characteristic value | Delayed fracture | |
|---|---|---|---|---|---|---|
| | V(H) *1 (%) | D$_A$ *2 (μm) | P ratio *3 | TS (MPa) | resistance | Remarks |
| 1 | 98 | 10 | 0.56 | 1497 | ○ | Inventive Example |
| 2 | 97 | 10 | 0.17 | 1493 | X | Comparative Example |
| 3 | 98 | 11 | 0.19 | 1495 | X | Comparative Example |
| 4 | 97 | 8 | 0.45 | 1582 | ○ | Inventive Example |
| 5 | 40 | — | 0.68 | 1614 | X | Comparative Example |
| 6 | 96 | 16 | 0.33 | 1544 | X | Comparative Example |
| 7 | 96 | 9 | 0.58 | 1720 | ○ | Inventive Example |
| 8 | 58 | — | 0.70 | 1739 | X | Comparative Example |
| 9 | 96 | 10 | 0.18 | 1705 | X | Comparative Example |
| 10 | 95 | 8 | 0.53 | 1843 | ○ | Inventive Example |
| 11 | 57 | 8 | 0.39 | 1581 | X | Comparative Example |
| 12 | 93 | 9 | 0.16 | 1792 | X | Comparative Example |
| 13 | 92 | 4 | 0.29 | 1926 | ○ | Inventive Example |
| 14 | 91 | 3 | 0.12 | 1774 | X | Comparative Example |
| 15 | 90 | 4 | 0.15 | 1877 | X | Comparative Example |
| 16 | 98 | 7 | 0.34 | 1365 | ○ | Inventive Example |
| 17 | 55 | — | 0.26 | 1190 | X | Comparative Example |
| 18 | 95 | 7 | 0.11 | 1108 | X | Comparative Example |
| 19 | 72 | 5 | 0.42 | 1229 | ○ | Inventive Example |
| 20 | 70 | 6 | 0.17 | 1225 | X | Comparative Example |
| 21 | 97 | 7 | 0.41 | 1607 | ○ | Inventive Example |
| 22 | 98 | 12 | 0.35 | 1585 | ○ | Inventive Example |
| 23 | 97 | 9 | 0.29 | 1572 | ○ | Inventive Example |
| 24 | 54 | — | 0.56 | 1088 | ○ | Comparative Example |
| 25 | 92 | 10 | 0.50 | 2224 | X | Comparative Example |
| 26 | 58 | — | 0.68 | 1689 | X | Comparative Example |
| 27 | 29 | — | 0.55 | 926 | ○ | Comparative Example |
| 28 | 95 | 11 | 0.48 | 1651 | X | Comparative Example |
| 29 | 97 | 14 | 0.28 | 1510 | X | Comparative Example |
| 30 | 97 | 11 | 0.24 | 1537 | X | Comparative Example |
| 31 | 98 | 9 | 0.45 | 1558 | X | Comparative Example |

*1 V(H): The total area fraction of bainite containing carbides and martensite.
*2 D$_A$: Grain size of prior austenite. "—" means that no prior austenite was present and measurement could not be performed.
*3 P ratio: The ratio of the height of a peak of P in an Auger electron spectrum at a position 5 nm or more from a prior-austenite grain boundary to the height of a peak of P in an Auger electron spectrum at the prior-austenite grain boundary.

In Inventive Examples, high-strength galvanized steel sheets having a TS of 1100 MPa or more and having excellent delayed fracture resistance were obtained. However, in Comparative Examples outside the range of the present invention, at least one of the desired TS and the desired delayed fracture resistance was not obtained.

The invention claimed is:
1. A hot-dip galvanized steel sheet having a chemical composition comprising, in mass %,
  C: 0.08 to 0.35%,
  Si: 0.01 to 3.0%,
  Mn: 2.0 to 4.0%,
  P: 0.010% or less (excluding 0),
  S: 0.002% or less (excluding 0),
  Al: 0.01 to 1.50%, and
  B: 0.0005 to 0.010% and
  further comprising one or more selected from
  Mo: 0.03 to 2.0% and

Ti: 0.010 to 0.10%, with the balance being Fe and unavoidable impurities, wherein the steel sheet has a steel microstructure in which, in a region extending from 300 to 400 µm from a surface layer of the steel sheet in a thickness direction of the steel sheet, the total area fraction of martensite and bainite containing carbides is 60 to 100%, and the average grain size of prior austenite is 15 µm or less, and in which, in the region extending from 300 to 400 µm from the surface layer of the steel sheet in the thickness direction of the steel sheet, the ratio of the height of a peak of P in an Auger electron spectrum at a position 5 nm or more from a prior-austenite grain boundary to the height of a peak of P in the Auger electron spectrum at the prior-austenite grain boundary is 0.20 or more, the peak of P in the Auger electron spectrum being measured using an Auger electron spectrometer during Ar ion sputtering, and wherein the steel sheet has a hot-dip galvanized layer on a surface thereof.

2. The hot-dip galvanized steel sheet according to claim 1, wherein the chemical composition further comprises, in mass %, one or more selected from the following groups A and B:

Group A:
one or more selected from:
Nb: 0.005 to 0.20% and
V: 0.005 to 2.0%

Group B:
One or more selected from:
Cr: 0.005 to 2.0%,
Ni: 0.005 to 2.0%,
Cu: 0.005 to 2.0%,
Ca: 0.0002 to 0.0050%,
REMs: 0.0002 to 0.0050%,
Sn: 0.001 to 0.05%, and
Sb: 0.001 to 0.05%.

3. The hot-dip galvanized steel sheet according to claim 1, wherein the hot-dip galvanized layer is a hot-dip galvannealed layer.

4. The hot-dip galvanized steel sheet according to claim 2, wherein the hot-dip galvanized layer is a hot-dip galvannealed layer.

5. A method for manufacturing the hot-dip galvanized steel sheet according to claim 1, the method comprising: subjecting a slab having the chemical composition according to claim 1 to hot rolling, cooling, and coiling to thereby produce a hot-rolled sheet; pickling the hot-rolled sheet; cold-rolling the resulting hot-rolled sheet; subjecting the cold-rolled sheet to annealing including heating to 750 to 950° C., holding for 10 to 600 s, then cooling to 550° C. at an average cooling rate of 3° C./s or higher, and holding at Ms temperature to 550° C. for 300 s or shorter; subjecting the annealed sheet to hot-dip galvanizing treatment; optionally subjecting the galvanized sheet to galvannealing treatment; cooling the resulting sheet to the Ms temperature at an average cooling rate of 1° C./s or higher; and then subjecting the resulting sheet to a cooling step such that the following formula (1) is satisfied, wherein, in the cooling step, a strain of more than 0% and 0.067% or less is imparted to the resulting sheet at 250° C. to the Ms temperature:

$$\mathrm{Log}_e([P] \times [C] \times (8.65 - 474 \times D_A \times [B]) \times t) + 35.4 \geq 13320/(273+T) + 4831/(273+T - 100 \times [Si]), \quad (1)$$

where, in formula (1), when $D_A \times [B] \geq 0.00912$, $D_A \times [B]$ is set to 0.00912, where [P], [C], [B], and [Si] in formula (1) are the contents (% by mass) of P, C, B, and Si, respectively, in the steel, where $D_A$ is the grain size (µm) of prior austenite, where T is retention temperature (° C.), and where t is a total retention time (s) at the retention temperature.

6. A method for manufacturing the hot-dip galvanized steel sheet according to claim 2, the method comprising: subjecting a slab having the chemical composition according to claim 2 to hot rolling, cooling, and coiling to thereby produce a hot-rolled sheet; pickling the hot-rolled sheet; cold-rolling the resulting hot-rolled sheet; subjecting the cold-rolled sheet to annealing including heating to 750 to 950° C., holding for 10 to 600 s, then cooling to 550° C. at an average cooling rate of 3° C./s or higher, and holding at Ms temperature to 550° C. for 300 s or shorter; subjecting the annealed sheet to hot-dip galvanizing treatment; optionally subjecting the galvanized sheet to galvannealing treatment; cooling the resulting sheet to the Ms temperature at an average cooling rate of 1° C./s or higher; and then subjecting the resulting sheet to a cooling step such that the following formula (1) is satisfied, wherein, in the cooling step, a strain of more than 0% and 0.067% or less is imparted to the resulting sheet at 250° C. to the Ms temperature:

$$\mathrm{Log}_e([P] \times [C] \times (8.65 - 474 \times D_A \times [B]) \times t) + 35.4 \geq 13320/(273+T) + 4831/(273+T - 100 \times [Si]), \quad (1)$$

where, in formula (1), when $D_A \times [B] \geq 0.00912$, $D_A \times [B]$ is set to 0.00912, where [P], [C], [B], and [Si] in formula (1) are the contents (% by mass) of P, C, B, and Si, respectively, in the steel, where $D_A$ is the grain size (µm) of prior austenite, where T is retention temperature (° C.), and where t is a total retention time (s) at the retention temperature.

7. A method for manufacturing the hot-dip galvanized steel sheet according to claim 1, the method comprising: subjecting a slab having the chemical composition according to claim 1 to hot rolling, cooling, and coiling to thereby produce a hot-rolled sheet; pickling the hot-rolled sheet; tempering the resulting hot-rolled sheet under the condition of a maximum temperature of lower than 400° C.; cold-rolling the resulting hot-rolled sheet at a rolling reduction of 70% or more; subjecting the cold-rolled sheet to annealing including heating to 750 to 950° C., holding for 10 to 600 s, cooling to 550° C. at an average cooling rate of 3° C./s or higher, and holding at Ms temperature to 550° C. for 300 s or shorter; subjecting the annealed sheet to hot-dip galvanizing treatment; optionally subjecting the galvanized sheet to galvannealing treatment; cooling the resulting sheet to the Ms temperature at an average cooling rate of 1° C./s or higher; and then subjecting the resulting sheet to a subsequent step such that the following formula (1) is satisfied, wherein, in the subsequent step, a strain of more than 0% and 0.067% or less is imparted to the resulting sheet at 250° C. to the Ms temperature:

$$\mathrm{Log}_e([P] \times [C] \times (8.65 - 474 \times D_A \times [B]) \times t) + 35.4 \geq 13320/(273+T) + 4831/(273+T - 100 \times [Si]), \quad (1)$$

where, in formula (1), when $D_A \times [B] \geq 0.00912$, $D_A \times [B]$ is set to 0.00912, where [P], [C], [B], and [Si] in formula (1) are the contents (% by mass) of P, C, B, and Si, respectively, in the steel, where $D_A$ is the grain size (µm) of prior austenite, where T is retention temperature (° C.), and where t is a total retention time (s) at the retention temperature.

8. A method for manufacturing the hot-dip galvanized steel sheet according to claim 2, the method comprising: subjecting a slab having the chemical composition according to claim 2 to hot rolling, cooling, and coiling to thereby produce a hot-rolled sheet; pickling the hot-rolled sheet; tempering the resulting hot-rolled sheet under the condition of a maximum temperature of lower than 400° C.; cold-rolling the resulting hot-rolled sheet at a rolling reduction of 70% or more; subjecting the cold-rolled sheet to annealing including heating to 750 to 950° C., holding for 10 to 600 s, cooling to 550° C. at an average cooling rate of 3° C./s or higher, and holding at Ms temperature to 550° C. for 300 s or shorter; subjecting the annealed sheet to hot-dip galvanizing treatment; optionally subjecting the galvanized sheet to galvannealing treatment; cooling the resulting sheet to the Ms temperature at an average cooling rate of 1° C./s or higher; and then subjecting the resulting sheet to a subsequent step such that the following formula (1) is satisfied, wherein, in the subsequent step, a strain of more than 0% and 0.067% or less is imparted to the resulting sheet at 250° C. to the Ms temperature:

$$\text{Log}_e([P]\times[C]\times(8.65-474\times D_A\times[B])\times t)+35.4 \geq 13320/(273+T)+4831/(273+T-100\times[Si]), \quad (1)$$

where, in formula (1), when $D_A \times [B] \geq 0.00912$, $D_A \times [B]$ is set to 0.00912, where [P], [C], [B], and [Si] in formula (1) are the contents (% by mass) of P, C, B, and Si, respectively, in the steel, where $D_A$ is the grain size (μm) of prior austenite, where T is retention temperature (° C.), and where t is a total retention time (s) at the retention temperature.

* * * * *